US007005959B2

(12) United States Patent
Amagasa et al.

(10) Patent No.: US 7,005,959 B2
(45) Date of Patent: Feb. 28, 2006

(54) KEY-LESS ENTRY SYSTEM FOR VEHICLE

(75) Inventors: Yoshinori Amagasa, Tokyo-To (JP); Noritoshi Yuzuriha, Tokyo-To (JP); Nobuzi Suzuki, Tokyo-To (JP); Masakazu Aoki, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/448,109

(22) Filed: May 30, 2003

(65) Prior Publication Data

US 2003/0222759 A1 Dec. 4, 2003

(30) Foreign Application Priority Data

May 31, 2002 (JP) ............................. 2002-158761

(51) Int. Cl.
*G05B 19/00* (2006.01)

(52) U.S. Cl. ......................... 340/5.3; 340/5.1; 340/5.2; 340/5.72; 340/5.6; 340/5.64; 340/5.65; 340/5.8; 340/426.36; 307/10.2; 307/10.1

(58) Field of Classification Search ................. 340/5.3, 340/5.1, 5.2, 5.72, 5.6, 5.64, 5.65, 5.8, 426.36; 307/10.1, 10.2
See application file for complete search history.

(56) References Cited

U.S. PATENT DOCUMENTS

| | | | |
|---|---|---|---|
| 5,204,672 A | 4/1993 | Brooks | |
| 5,602,535 A | 2/1997 | Boyles et al. | |
| 6,072,403 A | 6/2000 | Iwasaki et al. | |
| 6,538,559 B1 * | 3/2003 | Okada | 340/5.72 |
| 6,725,138 B1 * | 4/2004 | DeLuca et al. | 701/36 |

FOREIGN PATENT DOCUMENTS

| | | |
|---|---|---|
| DE | 198 05 659 | 3/1999 |
| EP | 0 927 803 | 7/1999 |
| EP | 0 984 124 | 3/2000 |
| EP | 1 046 771 | 10/2000 |

* cited by examiner

*Primary Examiner*—Brian Zimmerman
*Assistant Examiner*—Vernal Brown
(74) *Attorney, Agent, or Firm*—Smith Gambrell & Russell LLP

(57) ABSTRACT

A vehicle key-less entry system includes a locking mechanism to lock or unlock vehicle doors; a door-handle detector to detect whether a door handle is manipulated and a manipulation mode when the door handle is detected as manipulated; a mobile device to record identification (ID) information and conduct non-contact communications using the ID information; an authenticator to perform an authentication procedure using the ID information through the non-contact communications with the mobile device when the door handle is detected as manipulated; and a locking controller to control the locking mechanism for locking or unlocking the vehicle door based on the manipulation mode detected by the door-handle detector when a result of the authentication procedure is positive. The door-handle detector may detect whether a door handle is manipulated only. The locking controller controls the locking mechanism for locking or unlocking the vehicle door when the vehicle door is detected as unlocked or locked by the locking-state detector when a result of the authentication procedure is positive.

10 Claims, 4 Drawing Sheets

KEY-LESS ENTRY SYSTEM FOR VEHICLE

BACKGROUND OF THE INVENTION

The present invention relates to a key-less entry system for locking/unlocking a vehicle door without inserting a key into a keyhole.

There are several types of key-less entry system for locking/unlocking vehicle doors by inserting a key into a keyhole.

One old type of key-less entry system employs a key equipped with a lock button and an unlock button for locking/unlocking vehicle doors by depressing these buttons.

In contrast, an advanced key-less entry system employs a portable communications device called a smart key, requiring no keyholes, for locking/unlocking vehicle doors.

In detail, vehicle doors are unlocked when a person such as a car owner carrying the smart key has approached a vehicle. The doors are then locked when he or she leaves the vehicle. The engine starts when he or she turns an engine-start knob while there is the smart key close to the vehicle.

The old type requires operations of depressing the lock and unlock buttons, thus inconvenient. The advanced type does not require any specific operations for locking/unlocking vehicle doors. The latter type, however, consumes power for always monitoring the smart key, thus escalating consumption of an in-vehicle battery and/or a battery installed in the smart key.

Moreover, the smart key forcefully unlocks vehicle doors when a person such as a car owner carrying the smart key has approached the vehicle, even though he or she does not want to do so.

SUMMARY OF THE INVENTION

A purpose of the present invention is to provide a key-less entry system with high operability and low energy consumption.

The present invention provides a key-less entry system for a vehicle comprising: a locking mechanism for locking or unlocking at least one vehicle door; a door-handle detector for detecting whether or not a door handle is manipulated and a manipulation mode when the door handle is detected as manipulated; a mobile device for recording identification (ID) information and conducting non-contact communications using the ID information; an authenticator for performing an authentication procedure using the ID information through the non-contact communications with the mobile device when the door handle is detected as manipulated; and a locking controller for controlling the locking mechanism for locking or unlocking the vehicle door based on the manipulation mode when a result of the authentication procedure is positive.

Furthermore, the present invention provides a key-less entry system comprising: a locking mechanism for locking or unlocking at least one vehicle door; a door-handle detector for detecting whether a door handle is manipulated; a locking-state detector for detecting whether the vehicle door has been locked or unlocked by the locking mechanism; a mobile device for recording identification (ID) information and conducting non-contact communications using the ID information; an authenticator for performing an authentication procedure using the ID information through the non-contact communications with the mobile device when the door handle is detected as manipulated; and a locking controller for controlling the locking mechanism to lock or unlock the vehicle door when the vehicle door is detected as unlocked or locked by the locking-state detector when a result of the authentication procedure is positive.

DETAILED DESCRIPTION OF THE EMBODIMENTS

Several embodiments according to the present invention will be disclosed with reference to the attached drawings.

Figure 1:
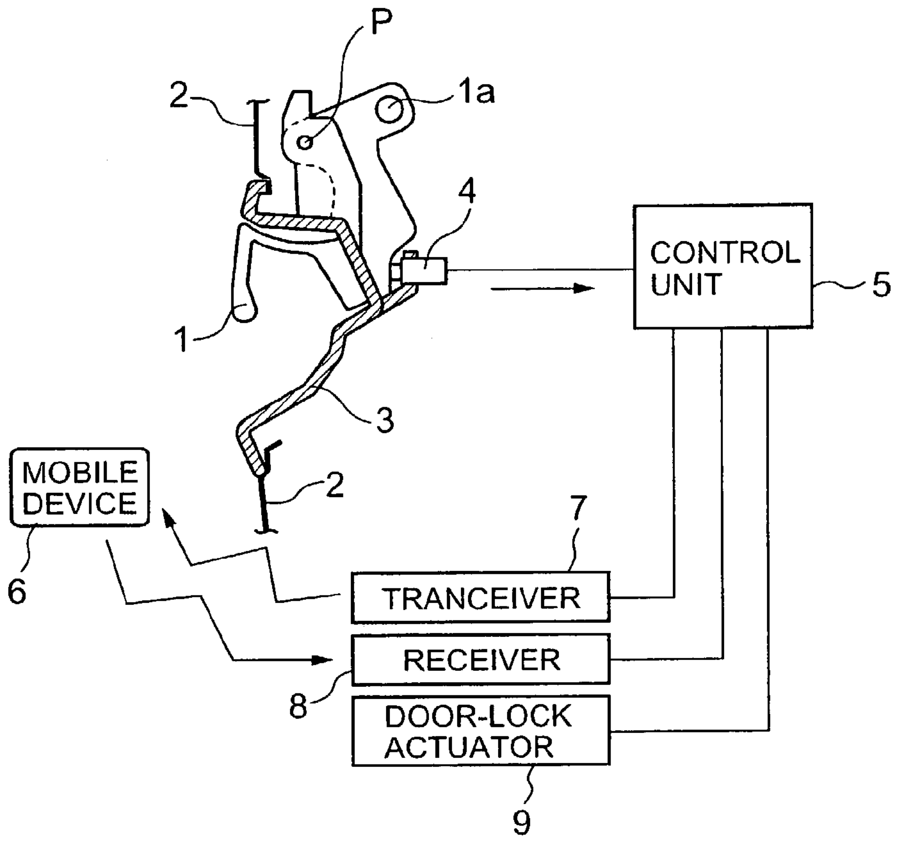
FIG. 1 shows a block diagram of a key-less entry system according to the present invention.
Figure 2:
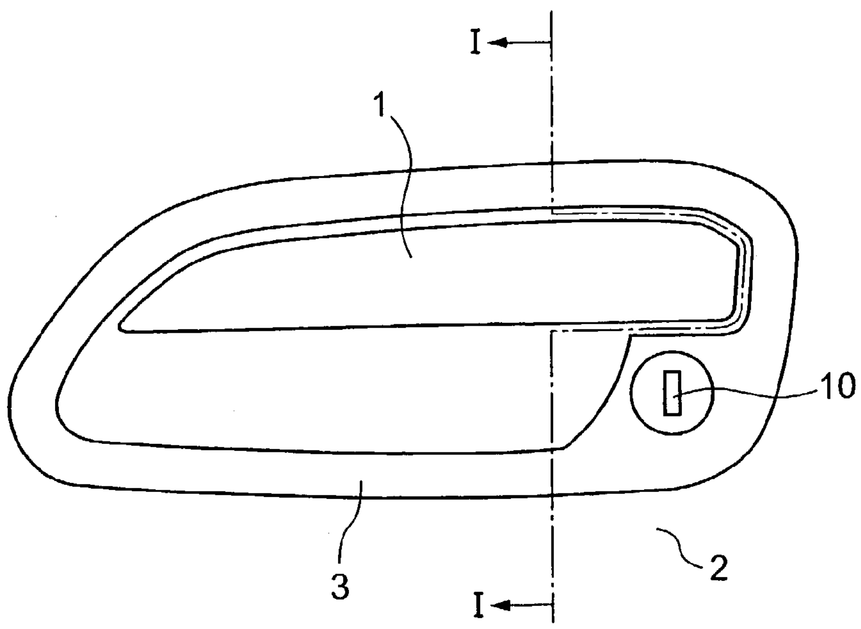
FIG. 2 shows a side view of a door handle and peripheral sections.

FIG. 2 shows an outline configuration of a first embodiment of key-less entry system according to the present invention. FIG. 1 is a sectional view taken on line I—I of FIG. 2, showing an exterior door handle 1.

The door handle 1 is attached to an escutcheon 3 embedded in a door outer panel 2 of each vehicle door. It is held at a specific position (not shown) with a spring, etc, but rotatable about a rotary axis P at which it is attached to the escutcheon 3.

The door handle 1 has a joint section 1*a* connected to a door latch (not shown) against a door-handle grip section, with respect to the rotary axis P. This mechanism allows the joint section 1*a* to shift to actuate the door latch when a car owner pulls the door handle 1. The joint section 1*a* is mechanically connected to the door latch with a rod or wire for opening a door, with no electrical mechanism.

Attached to the escutcheon 3 is a sensor 4 (door-handle manipulation sensor) for detecting movements of the door handle 1. The sensor 4 has a rod (not shown) usually touching a part of the door handle 1. The sensor 4 detects manipulation of the door handle 1 and how it is manipulated (manipulation modes) in accordance with the rod's reciprocal movements. Detection of manipulated mode will be disclosed in later detail.

The sensor 4 is connected to a control unit 5 for controlling vehicle-door locking/unlocking. The control unit 5 consists of CPU, RAM, ROM, etc.

Also connected to the control unit 5 are a mobile device 6 (disclosed later), a transceiver 7 and a receiver 8 (in-vehicle communications system) for non-contact communications with the mobile device 6.

The transceiver 7 and the receiver 8 are installed in the control unit 5. Instead, they may be installed in a door, apart form the control unit 5, depending on radio magnetic field intensity.

Still, further connected to the control unit 5 is a door-lock actuator 9 for actuating a locking section of a locking mechanism for locking/unlocking a vehicle door. The door-lock actuator 9 actuating the locking section for locking/unlocking the door under control by a control signal from the control unit 5.

The locking mechanism is not disclosed in detail because it is a known vehicle-door locking mechanism. At least one locking mechanism among those for several vehicle doors allows manual door locking/unlocking by inserting a key into a keyhole 10 (FIG. 2) and turning it. Thus, the first embodiment is feasible to locking/unlocking even if the buttery is dead.

The mobile device 6 for non-contact communications with the transceiver 7 and the receiver 8 is used for an authentication procedure. It is provided at a head of the key. Installed in the mobile device 6 are a recorder that records ID (identification) information for the authentication procedure and a transceiver (mobile-device communications section) for transmitting the ID information to the in-vehicle control unit 5. Also installed in the mobile device 6 is a replaceable button cell battery for generating electrical energy for non-contact communications.

The control unit 5 functions as an authentication means (the authentication procedure being disclosed later). It also functions as a locking control means for controlling the locking mechanism for door locking/unlocking operations.

The sensor 4 may be installed only in the door for a driver's seat. Or, several sensors 4 may be installed in all doors, a trunk opener and a rear-hatch opener, etc.

Figure 3:
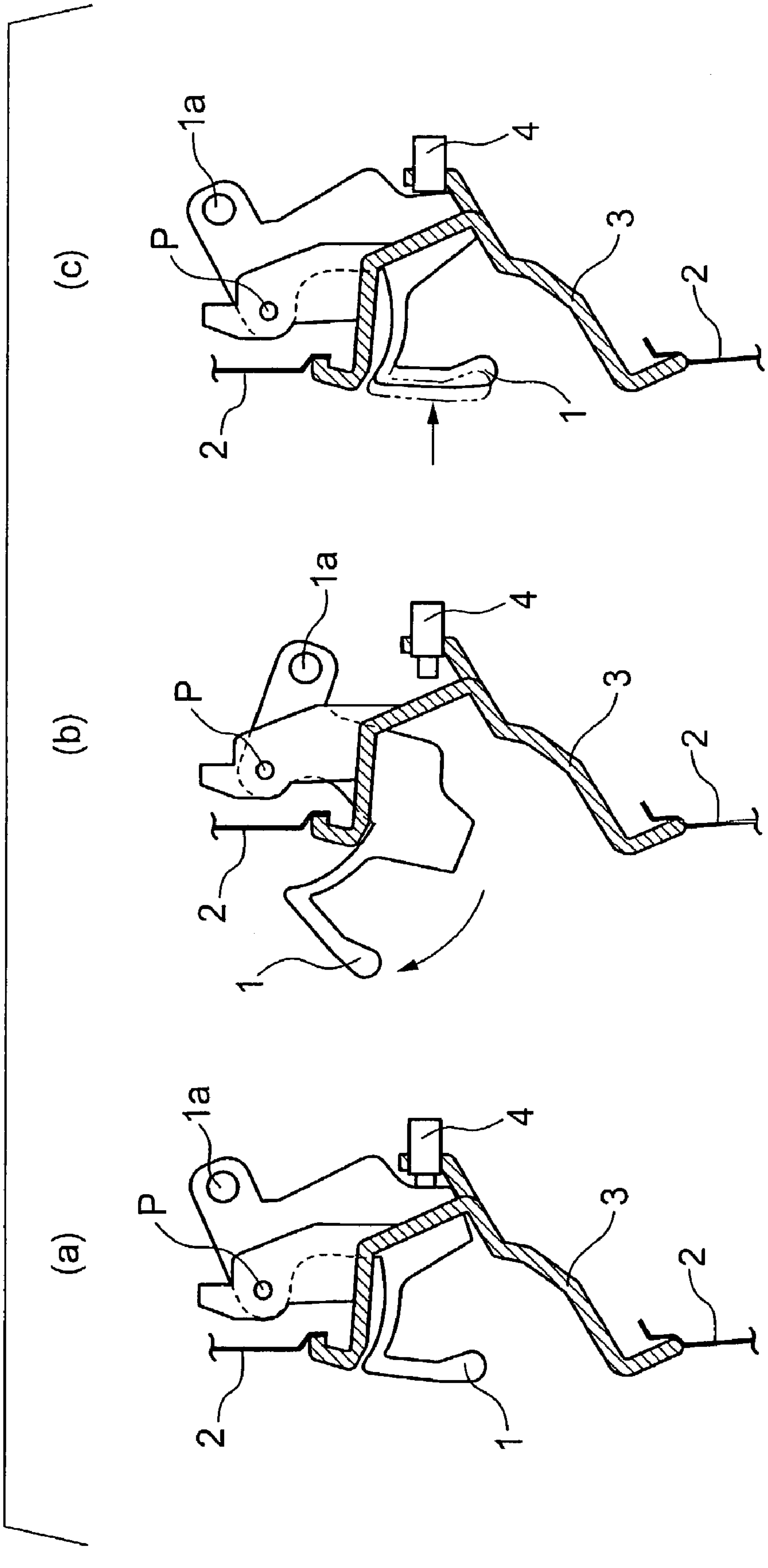
FIG. 3 illustrates manipulation of the door handle in the key-less entry system shown in FIG. 1.

Disclosed next with reference FIG. 3 is detection of manipulation modes with the sensor 4, or how the door handle 1 has been manipulated.

The manipulation modes to be detected in this embodiment are that the door handle 1 has been pulled or pushed.

FIG. 3(*a*) illustrates that the door handle 1 is closed, or under no manipulation. FIG. 3(*b*) illustrates that the door handle 1 is pulled, or unlocked. FIG. 3(*c*) illustrates that the door handle 1 is pushed, or locked.

The sensor 4 detects whether the door handle 1 has been manipulated and also detects one of these three manipulation modes.

In detail, when the door handle 1 is not manipulated, the sensor rod touches a part of the handle 1 (the degree of protrusion of the rod is medium), as illustrated in FIG. 3(*a*).

When the door handle 1 is pulled, the sensor rod is protruded by the spring installed in the sensor 4, as illustrated in FIG. 3(*b*).

On the contrary, when the door handle 1 is pushed, the sensor rod is depressed into the sensor 4, as illustrated in FIG. 3(*c*).

The sensor 4 is a contact-switch type sensor having two contact switches therein, one touching the rode when the rod is protruded, the other touching the rode when the rod is depressed.

The door handle 1 is detected as manipulated when the sensor rod is protruded or depressed. Furthermore, the door handle 1 is detected as pulled when the sensor rod is protruded whereas pushed when depressed.

As illustrated in FIG. 3(*b*), the degree of pulling the door handle 1 is quite larger than the amount detected by the sensor 4. Given this fact, the locking mechanism connected to the joint section 1*a* initiates an unlocking operation when the door handle 1 is further pulled after the sensor 4 has detected the manipulation mode.

Disclosed next are the locking/unlocking procedure with the authentication procedure.

Disclosed first is the unlocking procedure. One requirement for this procedure is that the car owner carries the mobile device (key) 6.

When the car owner (or other passenger with the mobile device 6) pulls the door handle 1 (action related to the unlocking procedure), this action is detected by the sensor 4.

Right after the detection, the control unit 5 transmits an ID-request signal to the mobile device 6 via the transmitter 7. In response to the ID-request signal, the mobile device 6 transmits the ID information stored in the recorder into the control unit 5. The control unit 5 receives the ID information via the receiver 8.

Based on the ID information, the control unit 5 determines whether the person who has pulled the door handle 1 is a right person having the authority to lock/unlock the doors.

If the determination (authentication) is negative, the control unit 5 gives off warning sounds indicating unauthentication.

The warning sounds will also be given off even when the right person tries to unlock the door with the dedicated mobile device 6 if signals carry noises between the control unit 5 and the mobile device 6, which depends on the environments.

The warning sounds indicating unauthentication helps the person who is trying to unlock the door know the situation.

If authenticated, on the contrary, the manipulation mode detected by the sensor 4 is unlocking (pulling the door handle 1). The control unit 5 sends an unlocking signal to the door-lock actuator 9 for the unlocking operation.

The control unit 5 may further give off warning sounds indicating authentication with a tone or pattern different from the warning sounds of unauthentication, which further helps the person who is trying to unlock the door know the situation.

The authentication procedure starts right after the sensor 4 has detected that the door handle 1 has been pulled. The person tying to unlock the door continues to pull the door handle 1. The authentication procedure completes when the door handle 1 has been pulled at the maximum range. The door latch is released to open the door.

Therefore, the authentication, unlocking and door-opening procedures are sequentially performed while the person pulls the door handle 1 in a single action.

Disclosed next is the locking procedure. One requirement for this procedure is also that the person trying to lock the door carries the mobile device (key) 6.

The locking procedure may not require authentication. Nevertheless, the locking procedure in this embodiment requires authentication which does not allow unauthorized persons to lock the door (such as shut the car owner up in the car).

When the car owner (or the other passenger) pushes the door handle 1 (action related to the locking procedure), this action is detected by the sensor 4.

Right after the detection, the control unit 5 transmits an ID-request signal to the mobile device 6 via the transmitter 7. In response to the ID-request signal, the mobile device 6 transmits the ID information to the control unit 5. The control unit 5 receives the ID information via the receiver 8.

Based on the ID information, the control unit 5 determines whether the person who has pushed the door handle 1 is a right person having the authority to lock/unlock the doors.

If the determination (authentication) is negative, the control unit 5 gives off warning sounds indicating unauthentication.

If authenticated, on the contrary, the manipulation mode detected by the sensor 4 is locking (pushing the door handle 1). The control unit 5 sends a locking signal to the door-lock actuator 9 for the locking operation.

The control unit 5 may further give off warning sounds indicating authentication with a tone or pattern different from the warning sounds of unauthentication, like for the unlocking operation.

The warning sounds may be different in tone or pattern between authentication and unauthentication or detected manipulation modes of the door handle 1. The warning sounds thus help the person who is trying to lock or unlock the door know how his or her action is judged.

The warning sounds may further be different in tone or pattern between locking or unlocking. The warning sounds help the person who is trying to lock or unlock the door easily know the final result of authentication procedure.

As disclosed above, the first embodiment completes the authentication procedure at the initial stage of car owner's action to the door handle 1 to try to get into the car and allows him or her continuing the unlocking operation to open the door.

In other words, the car owner's will to try to get into the car is detected based on the manipulation of the door handle 1 and this manipulation leads to the door unlocking operation.

Therefore, the first embodiment inhibits door unlocking for anyone just approaching the car even if he or she carries the mobile device 6 (key). Allowing door unlocking for the person just approaching the car is not feasible for security and causes excess power consumption.

Detected in the first embodiment as the manipulation mode is that the door handle 1 is pushed or pulled.

In addition, a sequential-manipulations number may be detected as a manipulation mode. The sequential-manipulations number is the number of times of manipulating the door handle 1 for a predetermined period of time.

Figure 4:
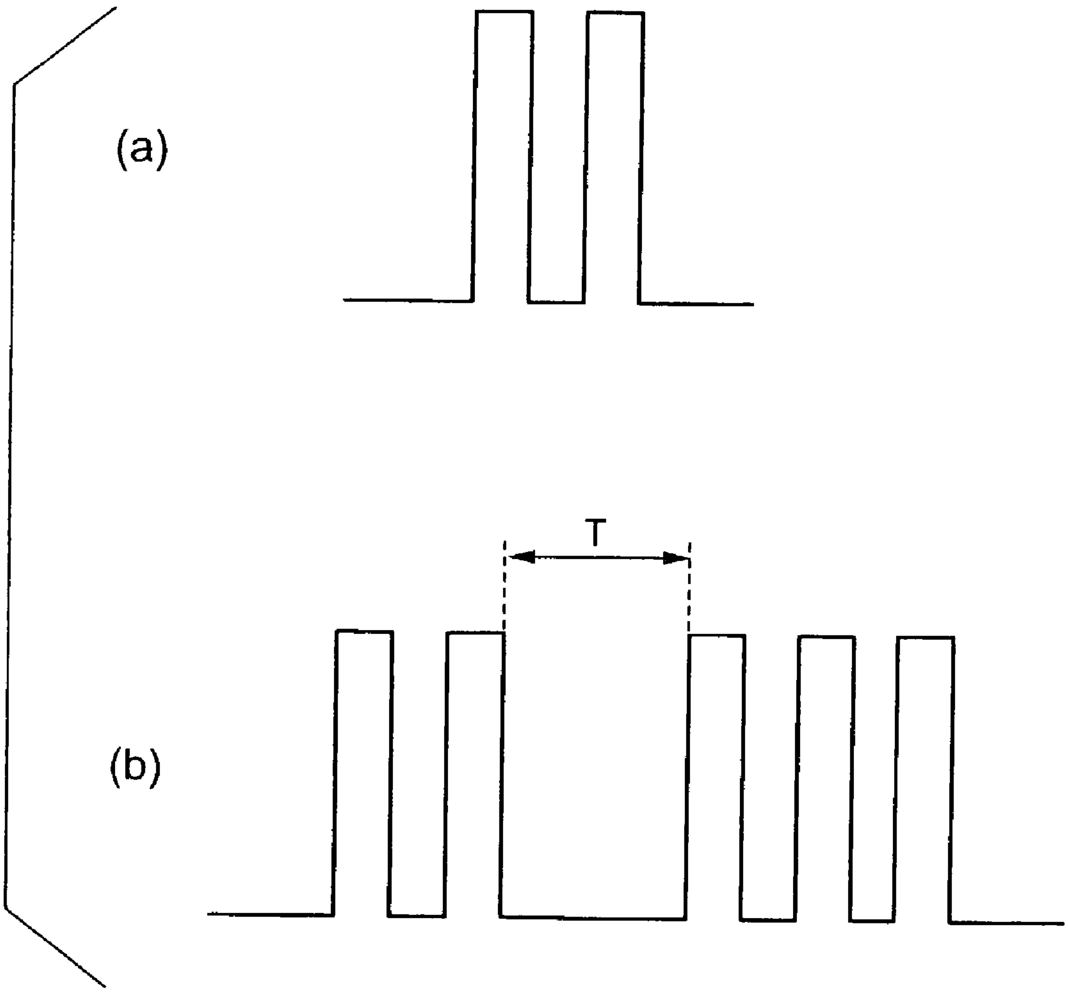
FIG. 4 illustrates detection of a sequential-manipulations number.

FIG. 4 illustrates detection of the sequential-manipulations number when the door handle 1 is pulled. Pulses at the low level indicate that the door handle 1 is not pulled whereas at the high level indicate that it is pulled.

In detail, FIG. 4(*a*) indicates that the sequential-manipulations number is two. In contrast, FIG. 4(*b*) indicates a first sequential-manipulations number is two and the following second sequential-manipulations number is three, not five in total because a period T between the first and the second sequential-manipulations numbers exceeds a predetermined period of time for detecting the sequential-manipulations number.

Even if a detected sequential-manipulations number is one, it is called the "sequential"-manipulations number in this invention.

The control unit 5 may be programmed as allowing door unlocking at the sequential-manipulations number of two, or inhibiting unlocking at the sequential-manipulations number of one. It may further be programmed as allowing door locking at the sequential-manipulations number of two, or inhibiting locking at the sequential-manipulations number of one.

The sequential-manipulations number settings enhance locking/unlocking security, especially, unlocking security. The settings further avoid an erroneous operation such as a locking operation in response to careless one push of the door handle 1.

User sequential-manipulations number settings at any desired number further enhance locking/unlocking security.

Different from the combination of door-handle pull/push and sequential-manipulations number described above, the sequential-manipulations number may only be detected as a manipulation mode. For example, locking/unlocking control may be effected as below under the sequential-manipulations number settings.

Pulling the door handle 1 two times allows unlocking whereas three times allows locking. Or, Pushing the door handle 1 two times allows unlocking whereas three times allows locking. Under the settings, the car owner pushes the door handle 1 two times and pulls it one time to open the door.

The authentication procedure disclosed above is also applied to the detection of sequential-manipulations number as the manipulation mode.

Warning sounds with tone or pattern different according to the detected manipulation mode under settings of the combination of door-handle pull/push and the sequential-manipulations number or the sequential-manipulations number only helps the person who is trying to lock or unlock the door know how his or her action is judged.

Under settings of the sequential-manipulations number only, the warning sounds with a tone or pattern different from those for the combination with the door-handle pull/push are especially feasible to the following situation:

Suppose that the car owner pushes or pulls the door handle 1 two times under the sequential-manipulations number setting at two. These actions could, however, be judged as two times as if under the sequential-manipulations number setting at one when a period between the two actions is longer than a predetermined period of time.

Moreover, warning sounds with different tones or patterns according to whether the door handle 1 is locked or unlocked helps the person who is trying to lock or unlock the door know how his or her action is judged.

Disclosed next is a second embodiment of vehicle keyless entry system according to the present invention. An outline configuration of the second embodiment is the same as the first embodiment shown in FIG. 1, hence detailed explanation of the configuration being omitted for brevity.

Different from the first embodiment, detected in the second embodiment is whether the door handle 1 is manipulated. In other words, the detection of manipulation mode is not essential in the second embodiment.

In the following disclosure, the sensor 4 detects pushing the door handle 1 only (with no manipulation-mode detection).

In other words, a locked state of a door is detected when the door handle 1 is pushed, thus the door being unlocked. Or, an unlocked state of the door is detected when the door handle 1 is pushed, thus the door being locked.

The locked or unlocked state is detected by the control unit 5 (functioning as a locking-state detector) according to the condition of the door-lock actuator 9.

The locking/unlocking procedure is disclosed with the authentication procedure.

One requirement in this embodiment is also that the car owner or anyone who tries to lock/unlock the door carries the mobile device (key) 6.

Suppose that the car owner (or the other passenger) tries to unlock the door.

When the car owner (or the other passenger) carrying the mobile device 6 pushes the door handle 1, this action is detected by the sensor 4.

Right after the detection, the control unit 5 transmits an ID-request signal to the mobile device 6 via the transmitter 7. In response to the ID-request signal, the mobile device 6 transmits the ID information stored in the recorder to the control unit 5. The control unit 5 receives the ID information via the receiver 8.

Based on the ID information, the control unit 5 determines whether the person who has pushed the door handle 1 is the right person having the authority to lock/unlock the doors.

If the determination (authentication) is negative, the control unit 5 gives off warning sounds indicating unauthentication. In contrast, if positive, the control unit 5 determines whether the door has been locked.

Warning sounds indicating authentication with a tone or pattern different from the warning sounds of unauthentication helps the person who is trying to unlock the door know the situation.

The control unit 5 then determines that the door has been locked. It sends an unlocking signal to the door-lock actuator 9 which then unlocks the door.

The tasks for the car owner (or the other passenger) for the authentication, unlocking and door-opening procedures are just sequential actions of pushing the door handle 1 one time and then pulling it.

Use of the door handle 1 which the car owner (or the other passenger) always touches when opening the door offers smooth authentication, unlocking and door-opening procedures.

Another supposition is that the car owner (or the other passenger) tries to lock the door. The authentication procedure is the same as for the door unlocking procedure described above and hence not disclosed.

Under a positive determination in the authentication procedure, the control unit 5 determines that the door has been unlocked. It sends a locking signal to the door-lock actuator 9 which then locks the door.

The tasks for the car owner (or his or her mate) for the authentication, locking and door-closing procedures are just sequential actions of holding the door handle 1 to close the door and pushing the handle 1.

Like the first embodiment, warning sounds indicating authentication with a tone or pattern different from the warning sounds of unauthentication based on the door-handle manipulation mode helps the person who is trying to unlock or lock the door know the situation.

Warning sounds may further be given off in different tone or pattern when door is locked or unlocked. The warning sounds help the person who is trying to lock or unlock the door easily know the final result of authentication procedure.

As disclosed in this embodiment, the locked/unlocked state is changed when the door handle 1 is manipulated in a specific manipulation mode to allow door unlocking/locking, thus high operability being achieved.

Electromagnetic waves are transmitted between the control unit 5 and the mobile device 6 after the door handle 1 is manipulated by the car owner (or the passenger), thus causing no unnecessary energy consumption.

Door locking/unlocking may be allowed based on detection of manipulation modes in addition to determination of whether the door handle 1 is manipulated, also in this embodiment.

Figure 5:
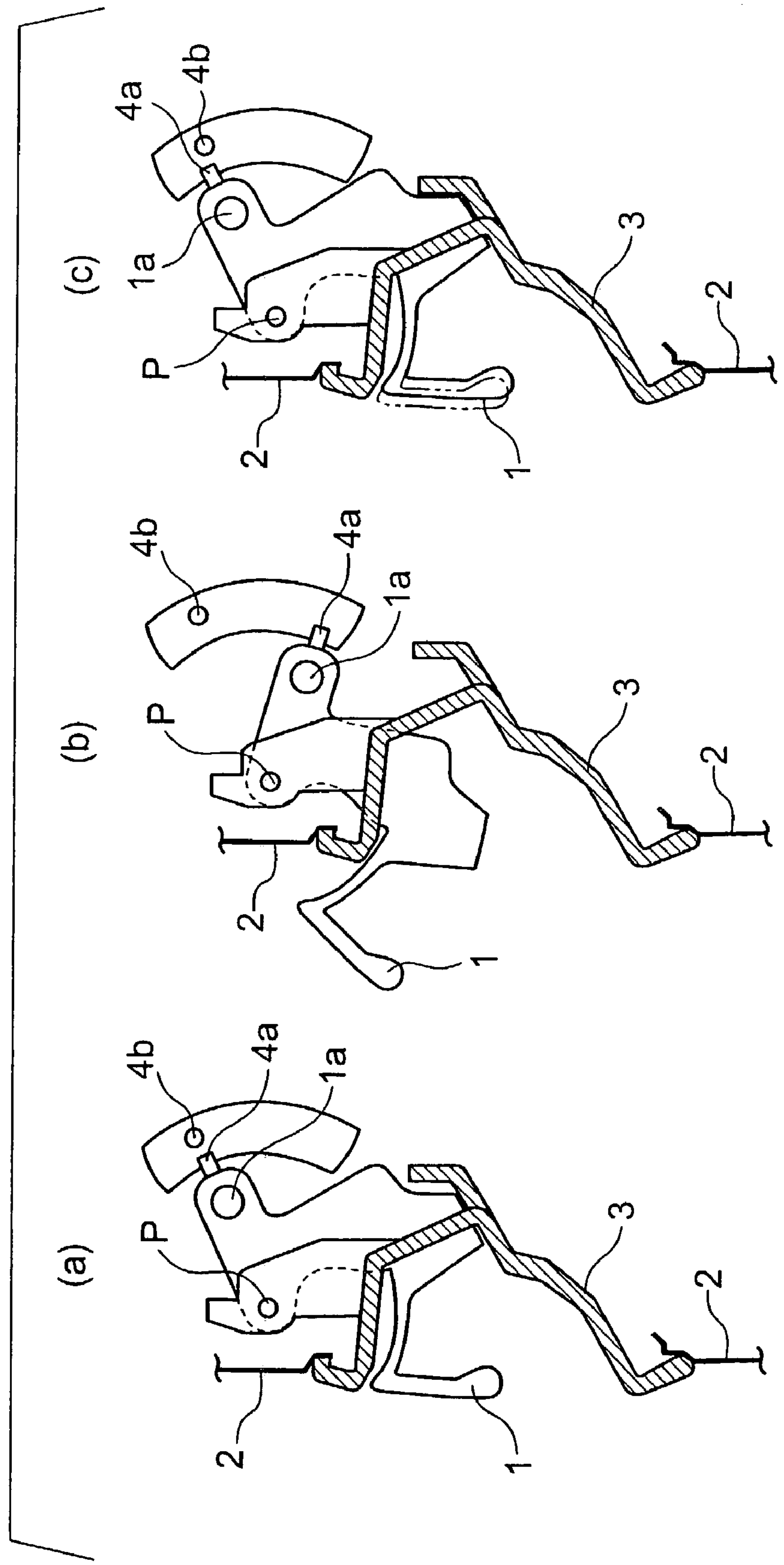
FIG. 5 illustrates a modification to the key-less entry system according to the present invention.

Not only the contact switch described above, the door-handle manipulation sensor (sensor 4) may be of a variable-resistor type or an electromagnetic type such as shown in FIG. 5 corresponding to FIG. 3.

An electromagnetic-type sensor shown in FIG. 5 is equipped with an electromagnet 4*a* and a detector 4*b*. The electromagnet 4*a* is provided on the door-handle side. The detector 4*b* is provided on the vehicle-body side.

The amount of magnetic flux detected by the detector 4*b* varies when the location of the electromagnet 4*a* against the detector 4*b* varies while the door handle 1 is being manipulated (pulled or pushed).

As disclosed in detail, the door-locking/unlocking operation is performed based on the manipulation modes of the door handle 1, thus the present invention achieving high operability.

The authentication procedure commences when the door handle 1 is manipulated, thus the present invention achieving saving energy.

The locking-state detector (control unit 5) determines whether the door has been locked or unlocked for unlocking/locking operation, thus the present invention achieving high operability.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A key-less entry system for a vehicle comprising:

a locking mechanism for locking or unlocking at least one vehicle door;

a door-handle detector for detecting whether or not a door handle is manipulated and a manipulation mode when the door handle is detected as manipulated;

a mobile device for recording identification (ID) information and conducting non-contact communications using the ID information;

an authenticator for performing an authentication procedure using the ID information through the non-contact communications with the mobile device when the door handle is detected as manipulated; and a locking controller for controlling the locking mechanism for locking or unlocking the vehicle door based on the manipulation mode when a result of the authentication procedure is positive, wherein the door-handle detector detects how many times the door handle is pushed or pulled for a predetermined period of time, as the manipulation mode.

2. The key-less entry system according to claim 1, wherein the door-handle detector detects whether the door handle is pushed or pulled, as the manipulation mode.

3. The key-less entry system according to claim 1, wherein the door-handle detector gives off warning sounds with a tone or pattern different in accordance with the detected manipulation mode.

4. The key-less entry system according to claim 1, wherein the locking controller gives off warning sounds with a tone or pattern different in accordance with whether the vehicle door is locked or unlocked by the locking mechanism.

5. The key-less entry system according to claim 1, wherein the authenticator gives off warning sounds when the result of the authentication procedure is negative.

6. The key-less entry system according to claim 1, wherein the authenticator gives off warning sounds with a tone or pattern different in accordance with whether the result of the authentication procedure is positive or negative.

7. A key-less entry system comprising:

a locking mechanism for locking or unlocking at least one vehicle door;

a door-handle detector for detecting whether a door handle is manipulated;

a locking-state detector for detecting whether the vehicle door has been locked or unlocked by the locking mechanism;

a mobile device for recording identification (ID) information and conducting non-contact communications using the ID information;

an authenticator for performing an authentication procedure using the ID information through the non-contact communications with the mobile device when the door handle is detected as manipulated; and a locking controller for controlling the locking mechanism for locking or unlocking the vehicle door when the vehicle door is detected as unlocked or locked by the locking-state detector when a result of the authentication procedure is positive.

wherein the door-handle detector detects how many times the door handle is pushed or pulled for a predetermined period of time, as the manipulation mode.

8. The key-less entry system according to claim 7, wherein the locking controller gives off warning sounds with a tone or pattern different in accordance with whether the vehicle door is locked or unlocked by the locking mechanism.

9. The key-less entry system according to claim 7, wherein the authenticator gives off warning sounds when the result of the authentication procedure is negative.

10. The key-less entry system according to claim 7, wherein the authenticator gives off warning sounds with a tone or pattern different in accordance with whether the result of the authentication procedure is positive or negative.

* * * * *